May 1, 1934.   J. J. BARTH ET AL   1,957,156
JIG SAW
Filed April 22, 1933   2 Sheets-Sheet 1
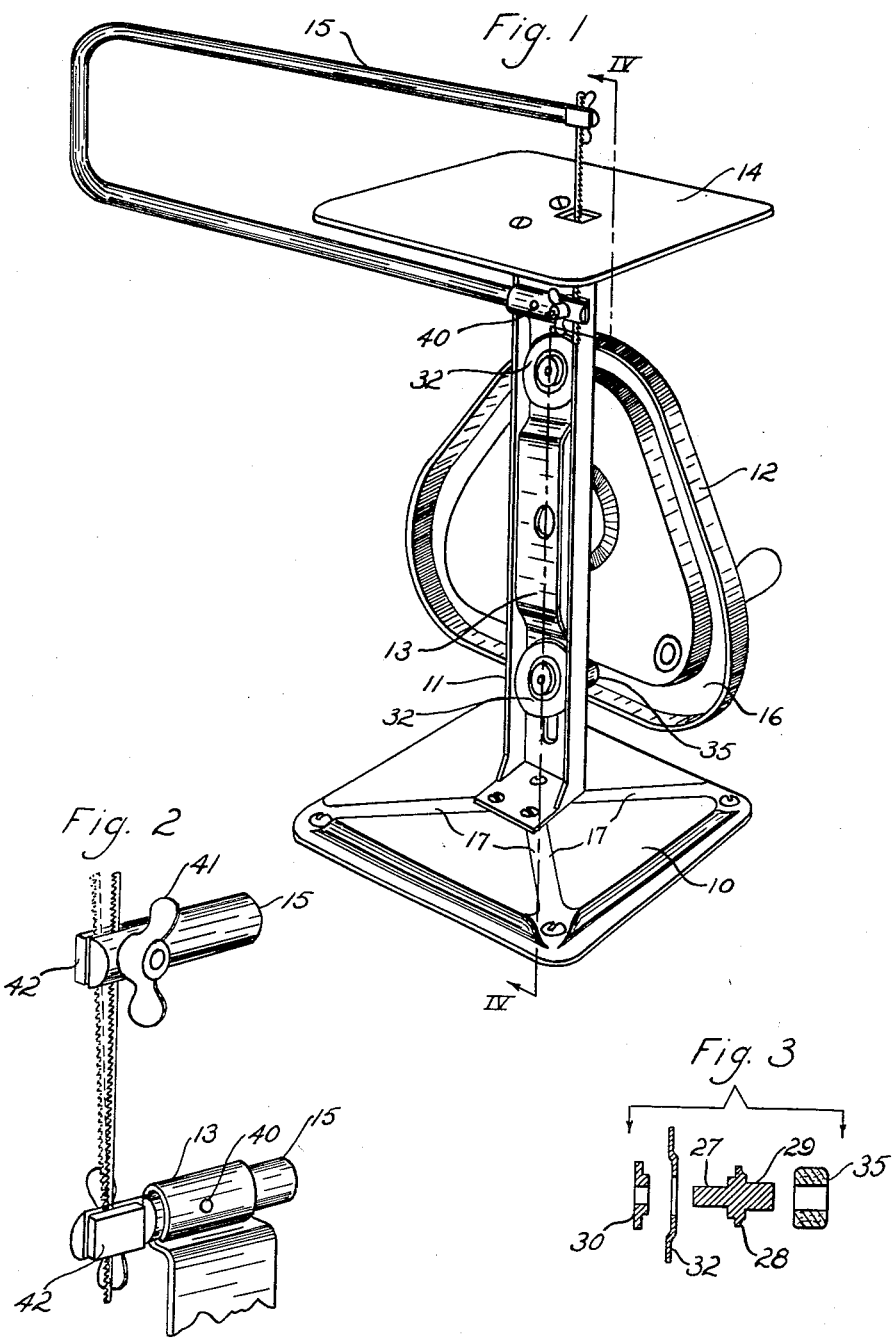
WITNESS.
INVENTORS.
JOHN J. BARTH
GLENN A. BARTH
BY
George V. Woodling
ATTORNEY.

May 1, 1934.    J. J. BARTH ET AL    1,957,156
JIG SAW
Filed April 22, 1933    2 Sheets-Sheet 2
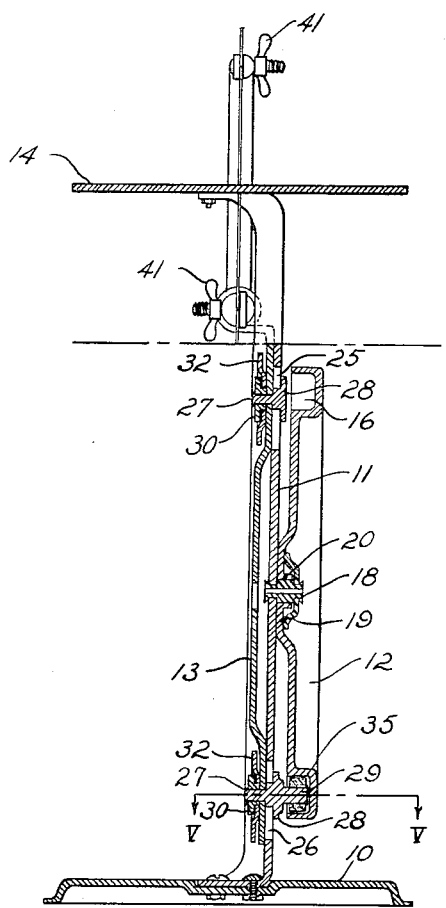
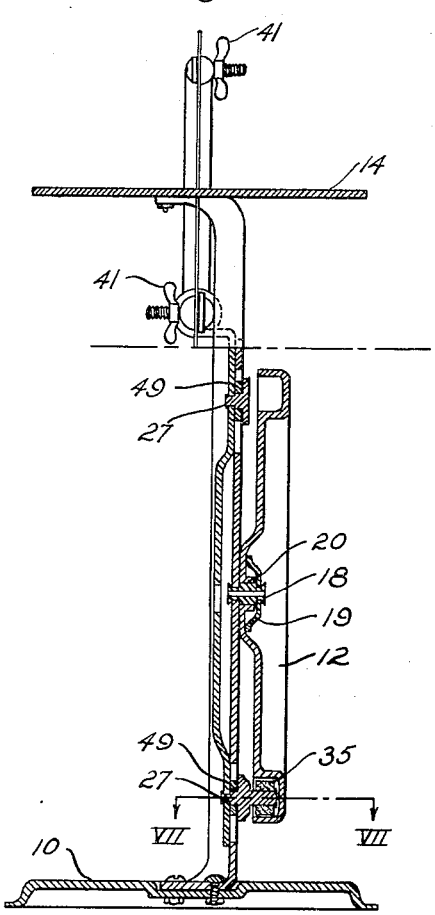
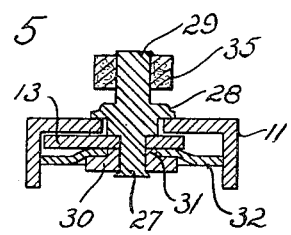
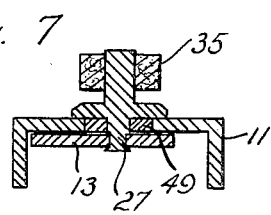
WITNESS.
*Jno. H. Weske*
INVENTORS.
JOHN J. BARTH
GLENN A. BARTH
BY
*George V. Woodling.*
ATTORNEY.

Patented May 1, 1934

1,957,156

UNITED STATES PATENT OFFICE 1,957,156

JIG SAW

John J. Barth and Glenn A. Barth, Cleveland, Ohio

Application April 22, 1933, Serial No. 667,436

3 Claims. (Cl. 143—71)

Our invention relates in general to saws and more in particular to jig-saws.

An object of our invention is the provision of a manually-operated jig-saw, which, when turned at a normal rate of speed by the hand, gives a rapid up and down movement of the saw, thus effecting a performance comparable to that of a jig-saw driven rapidly by an electric motor.

Another object of our invention is to provide for causing the saw to make more than one working cycle for each revolution of the operating crank.

Another object of our invention is to provide for adjustably positioning the saw either in a vertical manner or at a slight forward angle from the vertical, in which latter position the saw, upon the downward stroke, moves forwardly into working engagement with the material being cut, and, upon the upward stroke retracts rearwardly from working engagement with the material being cut, thus preventing the saw, during the upward stroke, from lifting or tending to lift the material from the working table.

A further object of our invention is the provision of a jig-saw having substantially all of the parts thereof stamped from sheet metal, thus producing a strong, compact, reliable and efficient device at a minimum manufacturing cost.

A still further object of our invention is the provision of a jig-saw in which the saw is rapidly operated through relatively short strokes by the cooperative action of a reciprocating member driven by the polar undulations of a non-circular cam.

Other objects and a fuller understanding of our invention may be had by referring to the following specification, taken in connection with the accompanying drawings, in which:

Fig. 1 is a perspective view of a jig-saw constructed in accordance with the novel features of our invention;

Fig. 2 is a fragmentary, perspective view of the open and resilient ends of the saw harp, and, shows, in addition, the adjustable positions of the saw;

Fig. 3 is a cross-sectional view of the parts that comprise the mounting between the triangular-shaped groove of the operating cam-disk member and the reciprocating member that slides within the upright channel member;

Fig. 4 is a cross-sectional and elevational view of our jig-saw, taken along the line IV—IV of Fig. 1;

Fig. 5 is a cross-sectional and plan view of our jig-saw, taken along the line V—V of Fig. 4;

Fig. 6 is a cross-sectional and elevational view similar to the view of Fig. 4, but of a modified form of our jig-saw, and Fig. 7 is a cross-sectional and plan view of the modified form of our jig-saw, taken along the line VII—VII of Fig. 6.

With reference to the drawings, our invention comprises, in general, a base 10, an upright channel member 11 mounted on the base 10, a reciprocating member 13 slidably mounted within the upright channel member 11, a manually operated cam-disk 12 rotatively mounted upon the upright channel member 11, a saw harp 15 carried by the upper end of the reciprocating member 13, and a work-table 14 supported upon the upper end of the upright channel 11.

The base 10 may be stamped out of sheet metal of suitable thickness to give a durable and rigid support for the upright channel member 11. In order to give additional stiffness to the base 10, diagonally positioned grooves 17 are formed therein during the stamping operation. By this construction, the combination of the reinforced base 10 and the upright channel member 11 constitutes a very strong and rigid structure for the mounting of the manually operated cam-disk 12 and the working-table 14.

As illustrated, the cam-disk 12 is rotatively mounted upon the upright channel member 11 by means of a rivet 18 and a stabilizing washer 19. In order to insure a good bearing surface, the central opening of the cam-disk 12 is provided with outwardly extending flange 20 formed thereon during the stamping operation of the cam-disk 12. By means of this mounting, the cam-disk is rigidly and firmly secured to the upright channel member 11 and, hence, is substantially free of any wabbling action while it is being rotated by the hand.

As illustrated best in Fig. 4, the upright channel member 11 is provided with two longitudinal slots 25 and 26. Mounted within the lower slot 26 and extending through a suitable opening of the adjacently disposed reciprocating member 13, is a duplex pin having two oppositely disposed pins 27 and 29 and a centrally positioned shoulder 28 that slides against the right-hand side of the upright channel member 11. A collar 30 having a stepped shoulder 31 is mounted on the outer left-hand end of the pin 27. Around the stepped shoulder 31 and engaging the inside surfaces of the upright channel member 11, is a guiding washer 32. In the assembling operations, the pin 27 is first inserted through the longitudinal opening 26, and then driven with a snug fit through both the reciprocating member 13 and the collar 30, after which the end of the pin 27 is up-set, thus holding all of the assembled parts together. By reason of the snug driving fit and the up-setting action, the pin 27 is constrained from rotating within the reciprocating member 13 and the stepped collar 30 is prevented from rotating around the pin 27. By this construction, the guiding washer 32 rotates about the relatively large bearing surface of the stepped shoulder 31 as the reciprocating member 13 is moved up and down.

By means of a similar construction, except that the duplex pin is replaced by a single pin 27, the upper end of the reciprocating member 31 is slidably mounted against the upright channel 11. In this upper mounting, the parts that correspond to similar parts of the lower mounting are represented by like reference characters. The guiding washers 32 are relatively large in diameter and, while they are disposed to fit closely between the inside surfaces of the upright channel member 11, they are free to roll as the reciprocating member 13 moves up and down. By reason of the fact that guiding washers 32 closely fit between the inside surfaces of the upright channel 11, together with the fact that the guiding washers are spaced relatively far apart, the reciprocating member 13 is substantially free of any wabbling action. As a result, the saw is perfectly guided, thus making it possible to cut very intricate figures, having arcuate outlines as small as one-sixteenth of an inch diameter circle. Then, too, the guiding washers 32 are substantially free from frictional wear for the reason that they rotate about the relatively large bearing surfaces afforded by the stepped shoulders 31 of the collars 30.

As a provision to reduce the rubbing as much as possible between the reciprocating member 13 and the upright channel member 11, the central portion of the reciprocating member is bent outwardly away from the channel member.

The up and down movements of the reciprocating member 13 is accomplished by the polar undulations of the triangular-shaped groove 16 acting against a fibre roller 35 that is mounted upon the pin 29. As well as possessing durable and lasting wearing properties, the fibre roller 35 is noiseless while in operation. By virtue of the triangular-shaped groove 16, the reciprocating member 13 and the saw are given three complete up and down movements for each revolution of the crank. Therefore, when the crank is turned at a normal rate of speed by the hand, the saw is actuated rapidly up and down, thus producing a sawing action comparable to that of a jig-saw driven rapidly by an electric motor. In our invention, the saw is actuated through relatively short strokes and at a relative rapid rate of speed. The strokes need be only long enough to clean the saw-dust from the material being cut.

The rapid movement of the saw through relatively short strokes makes it possible to cut very intricate figures having curvatures of very small diameter circles, without tearing or fraying the material being cut.

As shown, the saw is held under tension by the open and resilient ends of the saw harp 15. To insure that the saw harp is always held in a vertical position, the upper end of the reciprocating member 13 is bent around and firmly engages, the lower arm of the saw harp, after which a pin 40 is forcibly driven in the hole, the end thereof is up-set, thus positively securing the pin in the hole.

As best illustrated in Fig. 2, the saw is held in the harp 15 by means of a screw clamp having a relatively large flat head 42 and a wing-nut 41. In this manner, the saw may be shifted vertically to bring new and unused teeth into working engagement with the material being cut. Also, our new and improved clamping means makes it possible to use saws of all types and lengths, and to position the saws in any desirable cutting position. For instance, the saw may be positioned either in a vertical manner or at a slight forward angle from the vertical (see Fig. 2), in which latter position the saw, upon the downward stroke, moves forwardly into working engagement with the material being cut, and, upon the upward stroke, retracts rearwardly from working engagement with the material being cut, thus preventing the saw during the upward stroke from lifting or tending to lift the material from the working-table 14.

In Figs. 6 and 7, we show a modified structure for slidably mounting the reciprocating member 13 to the upright channel member 11. In this modified form, the slidably mounted pins 27 are guided directly within the longitudinal slots 25 and 26 by means of rollers 49 that closely, but freely, engage the inside surfaces of the longitudinal slots. The pins 27 are forcibly driven into suitable holes provided in the reciprocating member 13 and then they are up-set, thus constraining them from rotating. Consequently, the rollers 49 rotate about the enlarged bearing surface of the pins 27. This provision keeps frictional wear down to a minimum. The other features of the modified form of our invention are the same as those shown and described in the preferred embodiments.

Since certain changes in our invention may be made without departing from the spirit and scope thereof, it is intended that all matters contained in the foregoing description and shown in the accompanying drawings shall be interpreted as illustrative and not in a limiting sense.

We claim as our invention:

1. A jig-saw comprising, in combination, a base, an upright channel member supported by the base, said channel member having two longitudinal openings, a reciprocating member disposed within the channel, a saw harp carried by the reciprocating member, means extending through the two longitudinal openings for securing the reciprocating member within the channel, rotary means mounted upon the securing means for guiding the reciprocating member within the upright channel member, an operating member having a triangular-shaped groove, means for rotatively mounting the operating member upon the upright channel member, a rotary member positioned in the triangular-shaped groove, and means for connecting the rotary member to one of the securing means.

2. A jig-saw comprising, in combination, a base, an upright channel member supported by the base, said channel member having two guiding flanges interconnected by a web, said web having two longitudinal openings spaced relatively far apart, a reciprocating member disposed to slidably engage the surface of the web that is embraced by the guiding flanges, a saw harp carried by the upper end of the reciprocating member, said reciprocating member having two openings positioned to register with the longitudinal openings of the web, a pin adapted to extend through each of the longitudinal openings of the web and the registered openings of the reciprocating member for slidably securing the reciprocating member against the surface of the web that is embraced by the guiding flanges, a guiding roller disposed to rotate about each of the pins and to rotatively engage the internal surface of the guiding flanges, for guiding the reciprocating member, a non-circular disk having a peripheral channel for operating the reciprocating member, a bearing member connected to the web, said disk being rotatively mounted upon the bearing member and having a depressed central flat portion for guiding the non-circular disk relative to the surface of the web that is opposite the side which is embraced by the guiding flanges, thus preventing the disk from wabbling when rotated, a third pin connected to one of the first-mentioned pins and disposed to extend within the peripheral channel of the non-circular disk, a roller adapted to rotate about the third pin and to fit into the peripheral channel of the non-circular disk for actuating the reciprocating member when the non-circular disk is operated.

3. A jig-saw comprising, in combination, a base, an upright channel member supported by the base, a reciprocating member disposed within the channel, a saw actuated by the reciprocating member, two spaced securing means cooperatively associated with the channel member for slidably securing the reciprocating member within the channel, rotary means mounted upon the securing means for guiding the reciprocating member within the upright channel member, a non-circular disk having a peripheral channel for operating the reciprocating member, a bearing member connected to the upright channel member, means for rotatively mounting the said disk upon the bearing member, and means connected to one of the securing means and having a portion thereof inserted within the peripheral channel of the disk for actuating the reciprocating member when the disk is rotated.

JOHN J. BARTH.
GLENN A. BARTH.